J. G. STROCK.
METALLIC PACKING.
APPLICATION FILED MAR. 9, 1918.
1,298,117.
Patented Mar. 25, 1919.
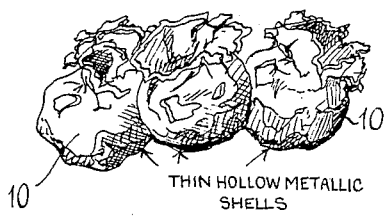
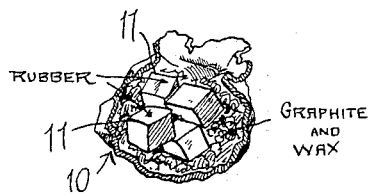
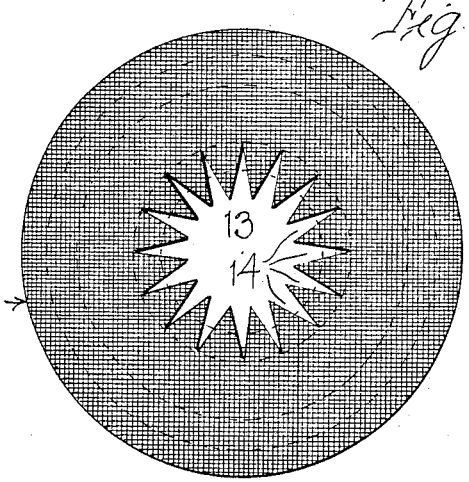
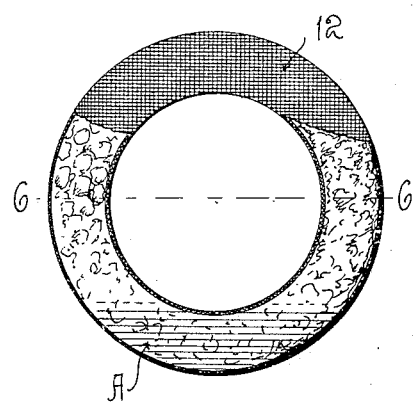
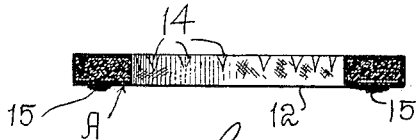
Inventor
Joseph G. Strock
By Watson E. Coleman
Attorney

UNITED STATES PATENT OFFICE.

JOSEPH G. STROCK, OF PITTSBURGH, PENNSYLVANIA.

METALLIC PACKING.

1,298,117.  Specification of Letters Patent.  Patented Mar. 25, 1919.

Original application filed October 24, 1917, Serial No. 198,336. Divided and this application filed March 9, 1918. Serial No. 221,529.

*To all whom it may concern:*

Be it known that I, JOSEPH G. STROCK, a citizen of the United States, residing at Pittsburgh, in the county of Allegheny and State of Pennsylvania, have invented certain new and useful Improvements in Metallic Packings, of which the following is a specification, reference being had to the accompanying drawings.

This invention relates to packings for use in stuffing boxes, and for packing piston rods, valve stems, shafts, centrifugal pumps, and other mechanisms, and particularly to packings having mixed therein a lubricating material, such as graphite.

The general object of my invention is to provide an elastic, metallic packing of such form and composition that the bulk of the packing will be maintained practically constant, even when subjected to variations in temperature, and in this connection to provide a packing which is composed of metallic particles or elements and rubber or other elastically compressible and expansible particles, the metallic and rubber particles being so intermingled that when the packing is in place and the metallic particles expand under heat, the elastic particles will be compressed, and when, on the other hand, the metallic particles contract upon diminution of the heat, the elastic particles will expand to compensate for such contraction.

Another object in this connection is to provide a packing which because it is composed of a mixture of rubber and metallic particles may be compressed or deformed in shape, without losing its elastically expansive quality.

A further object of the invention is to provide a packing of this character composed of metallic particles of such form that they will inclose and form cells for the elastic particles and also form cells for the inclusion of graphite and wax or other like lubricating agent.

Still another object is to provide a packing of this character which may be readily made, readily pressed into any desired shape, so as to suit different situations, and to provide a plastic or pliable casing for the plastic packing itself, which will hold the packing in shape and yet permit expansion and contraction of the packing.

A further object is to provide a packing suitable for use in connection with all mechanically moving parts, either reciprocating or rotary, the packing being so formed that it is possible to secure a tight joint at all times under changes of temperature, without causing undue friction or leakage.

My invention is illustrated in the accompanying drawings, wherein:—

Figure 1 is an enlarged perspective view of the shells which form one ingredient of my packing;

Fig. 2 is a sectional view of one of the shells showing the rubber, graphite and wax included therein;

Fig. 3 is a partly sectional view of the packing after it is compressed and before the cover is put on;

Fig. 4 is a plan view of the blank from which the cover is made;

Fig. 5 is a top plan view of the packing ring, constructed in accordance with my invention, the cover being partly broken away; and Fig. 6 is a sectional view on the line 6—6 of Fig. 5.

Where a packing of the character described for moving parts is made from materials that expand under increase of temperature, the mass will expand under this rise of temperature. This expansion of the packing under rise of temperature is, of course, particularly true of metallic packings, in which lead and tin are important ingredients which ingredients have a relatively high coefficient of expansion. Therefore, in order to form a thoroughly effective packing, including these elements, some material must be mixed therewith in such form as to compensate for this expansion. If this is not done, the packing when used in practice will cause undue friction on the working parts, as all packings of this character are compressible and in actual operation they are compressed in the stuffing boxes or glands, to such an extent as to show no leakage under ordinary conditions, and under low temperature. When there is a rise in temperature, the packing, which as before stated is composed principally of lead and tin, will expand to an extent 2½ times greater than the cast iron stuffing box and piston rod and thus the packing acts as a brake, causing undue friction, loss of power and consequent loss of money. Lubrication will not compensate for this increase of friction.

In order to secure a packing in which the excess expansion of the metallic ingredients is compensated for, and thus obviate the objections heretofore named, a material must be combined with the metallic ingredients that will oppose this expansive action, and to this end I use in connection with metallic particles, rubber in granulated form, and preferably black granular composition rubber which contains graphite. The action of the heat generated by friction of the moving parts tends to liberate this graphite, and thus by using this rubber composition, I provide a store of graphite which will later act as a lubricant.

In order to produce a compensating, plastic, metallic packing of the character described, I use as one of the ingredients, metal shells 10 or cells composed of lead, tin, antimony and copper in any proportions required to produce a bearing alloy, these shells being formed by dropping the molten metal into water, as fully set forth in my co-pending application filed October 24, 1917, No. 198,336, of which application this is a division. The molten metal is dropped into water from a predetermined height, depending upon the size of the shells which it is desired to make, and when these drops of molten metal strike the water, they explode, each drop forming a more or less globular, hollow shell, with somewhat perforated walls and with ragged edges. The shells thus formed are compressible and plastic or pliable, but not elastic. They are designed to contain the lubricating agent, along with the rubber heretofore referred to, and they will only give up the lubricating agent upon compression, thus producing a supply of lubricant discharged from the interior of the shell, each time the packing is adjusted for use.

The next step in forming the packing is to place a mass of these shells in a container and note the level to which the container is filled. Into the container is then poured a mass of composition black sheet rubber previously cut into cubes, each cube being ¼″ square. The mass of shells and the granular or cubical rubber 11 is then thoroughly mixed, until it is seen that the total height of the mixture of rubber and shells has been decreased, indicating that the granular rubber has, to a large extent, been received within the interior of the shells so that each of the shells is more or less filled with these granular elastic particles. After this mixing of the rubber particles and the metallic shells has been secured, ½ pound of graphite is added to each 5 pounds of mixed shells and rubber, and to this mass is also added a sufficient quantity of melted paraffin wax to properly lubricate and bind the mixture. After the contents of the container is thoroughly mixed, the material is ready to be molded into rings or other forms of any desired size by means of dies.

The object of using thin metallic hollow shells more or less perforated and having ragged edges is to provide an armor, as it may be called, for the cubes of composition rubber, as it is through the agency of these cubes or granules of rubber that I compensate for the expansion of the metal component of the packing under a rise of temperature and for the contraction of the metal component under a fall in temperature.

In order to render the packing rings formed of the composition above described less fragile, and prevent them being easily broken, where the packing rings are to be shipped or handled, I place the annulus formed of the composition above described in a casing or cover of fine mesh, or wire gauze made of brass or copper.

To this end I take a piece of fine wire gauze, designated 12 and so cut it as to provide a circular piece having a diameter equal to the diameter of the packing ring A, plus twice the height of the ring, plus once the width of the ring. The piece of wire gauze is cut out at its middle, as at 13, so that the inside diameter of the annulus thus formed is equal to the diameter of the piston rod for which the packing is intended to be used, minus twice the height of the ring and the thickness of the ring. A plurality of radial incisions 14 are then made in the wire gauze, each having a length of about one-half the diameter of the piston rod, in order that the screen may not be torn when it is pressed into shape.

The piece of fine wire gauze cut as before described is now placed in a die about 1/16″ larger in dimensions than the ring A and the gauze is pressed into shape so as to provide an annular casing. The packing ring A is now slipped into the casing and both the casing and inclosed ring are disposed in the press and the open end of the casing is closed. After the completed incased packing ring is removed from the press, the edges of the gauze screen are soldered together as at 15. After the packing A is inclosed within its gauze covering, the packing can be sawed in half so that it can be placed on a piston rod and the shells will not fall out of the packing ring nor disintegrate, nor will the cutting of the packing ring in half otherwise mar or injure the packing ring or render it unfit for service. The value of a packing constructed as before described may be particularly illustrated by reference to its use in a refrigerating pump where often times a change of 100° is attained at the piston rod stuffing box.

The action of this packing is as follows: With the packing in its compressed condition ready for use, the metal shells are forced into close contiguity with each other and with the rubber and under a rise of temperature these metal shells or rather the walls of the shells will expand, that is, the metal between the rubber particles will increases in thickness and, therefore, the rubber particles will be compressed. Under a decrease of temperature the metal inclosing the rubber particles or disposed between the rubber particles will contract, that is, decrease in thickness and the included rubber would expand, thus providing a compensating packing which will create no undue friction on a piston under a rise of temperature and which will not leak under a fall of temperature. It will be noted that these rubber particles are armored or surrounded by metal so that they will not come into contact with the moving parts.

I do not wish to be limited to any particular composition for the metallic element of the packing as it is obvious that this may vary considerably. It will be noted also that as the rubber is inclosed within these metallic shells, the shells armor the rubber and graphite and protect them from condensation and the direct frictional action and pressure of the reciprocating rod, revolving shaft or other mechanical element coming in contact therewith.

Having described my invention, what I claim is:

1. A metallic packing having as one of its ingredients, hollow somewhat globular thin metal shells of pliable, substantially non-elastic, anti-frictional metal.

2. As an article of manufacture and as a packing ingredient, a hollow, somewhat globular shell of thin metal having anti-frictional qualities.

3. As an article of manufacture and as a packing ingredient, a hollow, somewhat globular shell of thin metal having anti-frictional qualities, the shell being perforated and having ragged edges.

4. A packing composed of a mass of intermixed, globular, perforated shells of thin anti-friction metal, a lubricating agent, and particles of elastically compressible and expansible material.

5. A packing composed of a mass of intermixed, globular, perforated shells of thin anti-friction metal, a lubricating agent, and particles of rubber.

6. A packing composed of a mass of intermixed, globular, perforated shells of thin anti-friction metal, a lubricating agent, and cubical particles of rubber.

7. A packing of the character described composed of globular, thin walled perforated shells, of pliable substantially non-elastic, anti-frictional metal, and particles of elastically expansible and compressible material disposed within said shells.

8. A metallic packing having as one of its ingredients anti-frictional metallic particles and as another ingredient a substantial proportion of elastic particles, the elastic particles compensating for the expansion and contraction of the metallic particles when the packing is confined.

9. A packing of the character described composed of a substantial proportion of anti-frictional bearing metal, and elastic particles which when the packing is under confinement will expand to compensate for the contraction of the first named ingredient and be compressed upon an expansion of the first named ingredient.

10. A packing of the character described including as ingredients particles of a substantial proportion of anti-frictional bearing metal, and particles of elastic material intimately mixed with the particles of metal, the packing being compressed.

11. A packing including particles of a substantial proportion of anti-frictional metal, graphite intimately mixed therewith, a binder, and particles of elastic material intermittently mixed therewith, the whole mass being compressed to bring the particles into intimate contiguity whereby when the packing is confined said elastic particles will be compressed upon expansion of the metallic particles and will expand as the metallic particles contract.

12. A packing of the character described, including graphite, wax, granules of rubber, and thin walled, hollow, perforated shells of metal having anti-frictional characteristics.

13. A packing having as one of its ingredients thin walled, hollow, somewhat globular, perforated shells of pliable substantially non-elastic, anti-frictional metal, and as another of its ingredients cubical particles of rubber inclosed within said shells and protected thereby.

14. A packing having as one of its ingredients thin walled, hollow, somewhat globular, perforated shells of pliable substantially non-elastic, anti-frictional metal, and as another of its ingredients cubical particles of composition rubber containing graphite inclosed within said shells and protected thereby.

15. As an article of manufacture, a packing composition composed of a substantial proportion of ingredients which compensate each for the expansion and contraction of the other to thereby cause the packing when confined in operative position to retain a predetermined bulk or cubical content under changes in temperature.

16. A method of forming plastic metallic packings consisting in intermixing with a mass composed of globular thin walled, pliable, non-elastic, metallic shells, a mass of granulated rubber until the granulated rubber has become inclosed within said shells, mixing graphite with said mass, and then mixing melted wax in said mass and pressing the mass so formed into the shape desired for the packing.

In testimony whereof I hereunto affix my signature in the presence of two witnesses.

JOSEPH G. STROCK.

Witnesses:
C. J. HOFFMANN,
C. J. HOFFMANN, Jr.